(12) United States Patent
Zhao et al.

(10) Patent No.: US 8,971,214 B2
(45) Date of Patent: Mar. 3, 2015

(54) METHOD AND APPARATUS FOR ACQUIRING TRAFFIC-ENGINEERING LABEL SWITCHED PATH

(75) Inventors: Wei Zhao, Shenzhen (CN); Dajiang Wang, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 189 days.

(21) Appl. No.: 13/512,124

(22) PCT Filed: Apr. 24, 2010

(86) PCT No.: PCT/CN2010/072001
§ 371 (c)(1),
(2), (4) Date: May 25, 2012

(87) PCT Pub. No.: WO2010/148740
PCT Pub. Date: Dec. 29, 2010

(65) Prior Publication Data
US 2012/0281592 A1  Nov. 8, 2012

(30) Foreign Application Priority Data
Dec. 15, 2009 (CN) .......................... 2009 1 0260902

(51) Int. Cl.
H04L 12/28 (2006.01)
H04L 12/24 (2006.01)
H04L 12/715 (2013.01)
H04L 12/717 (2013.01)
H04L 12/721 (2013.01)
H04L 12/723 (2013.01)

(52) U.S. Cl.
CPC ................ *H04L 41/12* (2013.01); *H04L 45/04* (2013.01); *H04L 45/42* (2013.01); *H04L 45/44* (2013.01); *H04L 45/50* (2013.01); *H04L 45/62* (2013.01)

USPC .......................... 370/255; 370/254; 370/400

(58) Field of Classification Search
CPC ......... H04L 41/12; H04L 45/04; H04L 45/42; H04L 45/44; H04L 45/62
USPC ......................................... 370/255, 254, 400
See application file for complete search history.

(56) References Cited

U.S. PATENT DOCUMENTS

| | | | |
|---|---|---|---|
| 2009/0103442 A1* | 4/2009 | Douville ....................... | 370/248 |
| 2009/0142056 A1* | 6/2009 | Bernstein et al. .............. | 398/49 |
| 2010/0208584 A1* | 8/2010 | Sone et al. .................... | 370/228 |
| 2012/0102228 A1* | 4/2012 | Cugini et al. ................. | 709/242 |

FOREIGN PATENT DOCUMENTS

| | | |
|---|---|---|
| CN | 101296178 | 10/2008 |
| CN | 101483539 | 7/2009 |
| CN | 101714953 | 5/2010 |

OTHER PUBLICATIONS

Douville et al., "A Service Plane over the PCE Architecture for Automatic Multidomain Connection-Oriented Services", IEEE Communications Magazine, Jun. 2008, pp. 94-102.

* cited by examiner

*Primary Examiner* — Omer S Mian
(74) *Attorney, Agent, or Firm* — Pearl Cohen Zedek Latzer Baratz LLP

(57) ABSTRACT

A method and apparatus for acquiring a Traffic-Engineering Label Switched Path (TE LSP) provided by the present invention relate to communication field. The method includes: performing path tracing from a source node to a target node, and obtaining a passing node passed by the path tracing; acquiring a Path Compute Element (PCE) in a region in which the passing node is located; acquiring traffic-engineering database of a region in which the PCE is located from the PCE; and according to the traffic-engineering database, obtaining the TE LSP between the source node and the target node.

6 Claims, 3 Drawing Sheets

METHOD AND APPARATUS FOR ACQUIRING TRAFFIC-ENGINEERING LABEL SWITCHED PATH

CROSS-REFERENCE TO RELATED APPLICATIONS

This application is a National Phase Application of PCT International Application No. PCT/CN2010/072001, entitled "METHOD AND APPARATUS FOR ACQUIRING TRAFFIC-ENGINEERING LABEL SWITCHED PATH", International Filing Date Apr. 21, 2010, published on Dec. 29, 2010 as International Publication No. WO 2010/148740,which in turn claims priority from Chinese Patent Application No. 200910260902.8, filed Dec. 15, 2009, both of which are incorporated herein by reference in their entirety.

TECHNICAL FIELD

The present invention relates to communication field, and particularly, to a method and apparatus for acquiring a Traffic-Engineering Label Switched Path (TE LSP).

BACKGROUND OF THE RELATED ART

In a Wavelength Division Mutiplexing (WDM) optical network, the put forwarding of Path Compute Element (PCE) and Path Compute Element Communication Protocol (PCEP) provides a practicable approach for a spanning path computation, and meanwhile creates a condition for interconnection and intercommunication of TE LSP computations of products of different manufacturers. Wherein, the WDM optical network includes multiple regions, each region includes multiple nodes, and the PCE in each region is configured with Traffic-Engineering Database (TED) of the current region and is responsible for path computing of the nodes in the current region. Since the TED of different regions is not shared, the PCE in a certain region only knows the Traffic-Engineering Database (TED) of the current region. If two nodes in different regions need to communicate, since the PCE of each region can not acquire the TED of other regions, the TE LSP can not be established for the two nodes, thus PCEs in different regions are required to perform the spanning path computation collaboratively. The related art gives a method for the spanning path computation: Backward-Recursive PCE-Based Computation (BRPC). The BRPC is a method for collaboratively collecting paths between the PCEs, but when the BRPC is used, the PCE of a region in which a source node is located needs to acquire a precondition for implementing the BRPC, which includes:

each PCE knowing a PCE corresponding to its adjacent region;

a region in which a target node is located;

a region passed by the TE LSP of the source node and target node;

boundary nodes in the region passed by the TE LSP of the source node and target node;

ingress boundary nodes and egress boundary nodes in the region passed by the TE LSP of the source node and target node.

In the related art, however, a method for how to acquire the above precondition is not given, which cause that the BRPC can not be used to perform the spanning path computation.

SUMMARY OF THE INVENTION

The method and apparatus for acquiring a Traffic-Engineering Label Switched Path (TE LSP) provided by the present invention can acquire a precondition for implementing a BRPC.

In order to achieve the above object of the present invention, the present invention provides a technical scheme as follows.

A method for acquiring a Traffic-Engineering Label Switched Path (TE LSP) comprises:

performing path tracing from a source node to a target node, and obtaining a passing node passed by the path tracing;

acquiring a Path Compute Element (PCE) in a region in which the passing node is located;

acquiring traffic-engineering database of a region in which the PCE is located from the PCE; and according to the traffic-engineering database, obtaining the TE LSP between the source node and the target node.

The method can further be characterized in that:

the step of acquiring traffic-engineering database of the PCE comprises:

acquiring boundary nodes in the region in which the PCE is located from the PCE;

from boundary nodes of each region, selecting an ingress boundary node and/or an egress boundary node in each region.

The method can further be characterized in that:

the step of selecting an ingress boundary node and/or an egress boundary node comprises:

if the path tracing passes the boundary node and a return path does not pass other boundary nodes of a region in which the boundary node is located, determining the boundary node as the ingress boundary node of the region in which the boundary node is located;

if the boundary node is directly connected with an ingress boundary node in a downstream adjacent region, determining the boundary node as the egress boundary node in a source region.

The method can further be characterized in that:

the step of obtaining the TE LSP between the source node and target node according to the traffic-engineering database comprises:

acquiring a segment path in each region, and the segment path comprising a path from the source node to the egress boundary node in the region, a path from the ingress boundary node to the target node in the region in which the target node is located, and a path between the ingress boundary node and egress boundary node in the region in which the passing node is located;

according to the segment path in each region, generating a full path between the source node and target node; and performing wavelength assignment for the generated full path, and if the wavelength assignment is successful, determining the full path as the TE LSP of the source node and target node.

The method can further be characterized in that: the method further comprises:

if the wavelength assignment is failed, determining a region in which the wavelength assignment is failed;

informing the PCE in the region in which the wavelength assignment is failed to increase a number of the segment paths.

An apparatus for acquiring a Traffic-Engineering Label Switched Path (TE LSP) comprises:

a passing node acquisition module, configured to: perform path tracing from a source node to a target node, and obtain a passing node passed by the path tracing;

a PCE information acquisition module, configured to: acquire a PCE in a region in which the passing node is located;

a database acquisition module, configured to: acquire traffic-engineering database of a region in which the PCE is located from the PCE; and a path acquisition module, configured to: according to the traffic-engineering database, obtain the TE LSP between the source node and the target node.

The apparatus can further be characterized in that: the database acquisition module comprises:

a boundary node acquisition unit, configured to: acquire boundary nodes in the region in which the PCE is located from the PCE;

an available node acquisition unit, configured to: from boundary nodes of each region, select an ingress boundary node and/or an egress boundary node in each region.

The apparatus can further be characterized in that: the available node acquisition unit is configured to:

if the path tracing passes the boundary node and a return path does not pass other boundary nodes of a region in which the boundary node is located, determine the boundary node as the ingress boundary node of the region in which the boundary node is located;

if the boundary node is directly connected with an ingress boundary node in a downstream adjacent region, determine the boundary node as the egress boundary node in a source region.

The apparatus can further be characterized in that: the path acquisition module comprises:

a segment path acquisition unit, configured to: acquire a segment path in each region, wherein, the segment path comprises a path from the source node to the egress boundary node in the region, a path from the ingress boundary node to the target node in the region in which the target node is located, and a path between the ingress boundary node and egress boundary node in the region in which the passing node is located;

a full path generation unit, configured to: according to the segment path in each region, generate a full path between the source node and target node; and a wavelength assignment unit, configured to: perform wavelength assignment for the generated full path, and if the wavelength assignment is successful, determine the full path as the TE LSP of the source node and target node.

The apparatus can further be characterized in that: the path acquisition module further comprises:

a determination unit, configured to: when the wavelength assignment of the full path is failed, determine a region in which the wavelength assignment is failed;

a notification unit, configured to: inform the PCE in the region in which the wavelength assignment is failed to increase a number of the segment paths.

In the technical scheme provided by the present invention, by performing path tracing from a source node to a target node, a PCE for path collaboration computing is obtained, and according to collaboration computing of the PCE, a TED used for the path collaboration computing is obtained, thereby acquiring a precondition used to implement the BRPC, implementing spanning path computing, and achieving the purpose of communication between two nodes in different regions.

PREFERRED EMBODIMENTS OF THE PRESENT INVENTION

The technical scheme provided by the example of the present invention will be further introduced in combination with accompanying drawings below.

Figure 1:
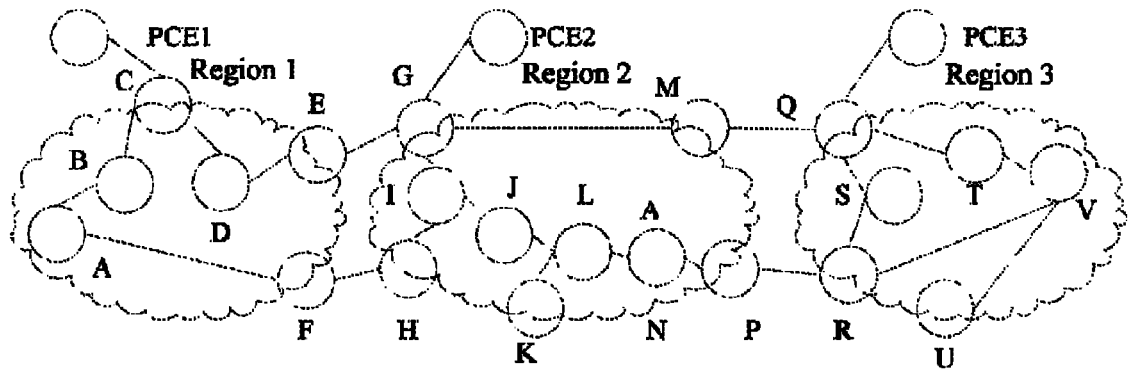
FIG. 1 is a schematic diagram of topological structure of an optical network provided by the present invention.
Figure 2:
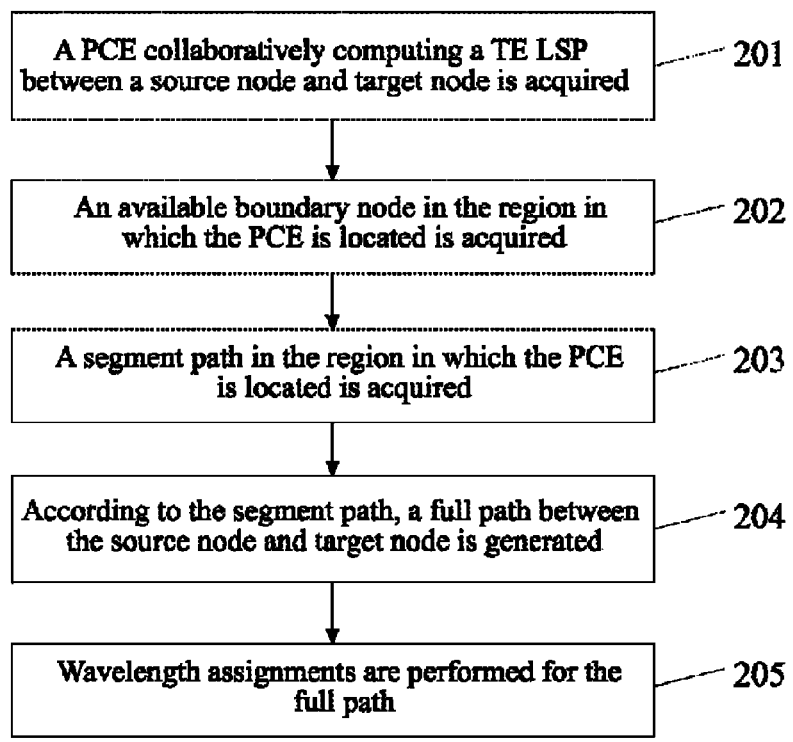
FIG. 2 is a flow diagram of the method for acquiring a Traffic-Engineering Label Switched Path provided by the present invention.

As shown in FIG. 1, an optical network includes multiple nodes, and the nodes are connected through an optical fiber with a wavelength $\lambda 1$. The network is divided into 3 regions, named region 1, region 2 and region 3 respectively; each region is configured with a PCE, named PCE1, PCE2 and PCE3 in sequence.

Wherein, each node in the network has a Path Computation Client (PCC) function, which requests the PCE in the current region for Routing Wavelength Assignment (RWA) and Impairment Validation (IV) and so on through a Path Compute Element Communication Protocol (PCEP), and meanwhile has a function of discovering all PCEs in the current region.

Wherein, the PCE not only has the above PCC function, but also has the following functions: receiving requests sent by the nodes, completing the RWA and Impairment Validation (IV) and so on, and returning calculation results; if the nodes need the PCE in other regions to assist in calculating, invoking a local PCC function to send an assistance request to the PCE in other regions; and possessing the function of discovering all PCEs in the current region.

The example of the present invention takes the network topological structure shown in FIG. 1 as an example to perform description, and in the condition of a conforming wavelength, a computation process of a TE LSP is as shown in FIG. 1.

The example takes that node A in region 1 needs to establish the TE LSP with the node V in region 2 as an example to perform description, which includes the following steps.

In step 201, PCEs collaboratively computing a TE LSP between a source node and target node is acquired.

Wherein, the PCE collaboratively performing computing is a PCE in a region spanned by the TE LSP between the source node and the target node.

Specifically, the PCEs collaboratively performing computing are acquired in the following way, which includes:

the node A performing path tracing to the node V, and obtaining a tracing path which reaches the node V, wherein the tracing path includes a passing node, namely a node passed in the process of path tracing. In the network as shown in FIG. 1, the path obtained by the path tracing is A, F, H, I, G, M, Q, T and V. The node A acquires a PCE in a region in which the passing node is located from the passing node, for example, the node A queries these passing nodes for PCEs in the regions in which the above passing nodes are located through a PCEP message. These passing nodes send the PCEs in the regions in which they are located to the node A through the PCEP message.

Wherein, methods which can implement the path tracing in the related art are all applicable to this step, such as Tracert technology and RSVP technology. When the Tracert technology is used, in order to guarantee communication safety, the nodes inside each region can be required not to reply a tracert message during the tracert, but only to forward the tracert message. When the RSVP technology is used, a passed path can be recorded through RRO.

In step 202, an available boundary node in the region in which the PCE is located is acquired.

Wherein, the available boundary node includes an egress boundary node in a target region in which the target node is located, an egress boundary node and an ingress boundary node in an intermediate passing region in which the passing node in the path tracing is located, and an egress boundary node in a source region in which the source node is located.

Specifically, the acquisition of the boundary nodes is described firstly.

The node A queries a PCE1 in the region in which the node A is located for boundary nodes in the current region, and obtains a node C, node E and node F; meanwhile, the node A informs the PCE1 of that the boundary nodes of the PCE2 and PCE3 are needed, the PCE1 determines that the PCE2 and PCE3 need to participate path collaborative computing, and the PCE1 sends an assistance request carrying the requirement to query the boundary nodes in the regions in which the PCE2 and PCE3 are located, and information of the obtained boundary nodes is sent to the node A, thus the node A obtains the boundary nodes of all regions, namely PCE1 (C, E, F), PCE2 (G, H, M, P, K) and PCE3 (Q, R, U).

The method for selecting the available boundary nodes from the above boundary nodes will be described below.

When the boundary node is located in the target region, a path tracing is done from the source node to the target node, and in the target region, if the path tracing goes through the boundary node and a return path does not pass other boundary nodes in the target region, the boundary node is determined as the ingress boundary node of the target region.

For example, path tracing is done from the node A to the node V, routing goes through the node Q in region 3 and the other boundary nodes of the region 3 are not included on the return path, thus the node Q can be determined as the ingress boundary node; and if the routing must go through the node U, but the other boundary nodes (e.g. the node R) of the region are included on the return path, the node U can not be determined as the ingress boundary node. With the above method, it can be determined that ingress nodes in the region 1 include the node Q and node R.

When the boundary node is located in the intermediate passing region, following two situations are included.

If the boundary node is located in a downstream region and directly connected with the ingress boundary node in a downstream adjacent region, the boundary node is determined as the egress boundary node of the medium passing region.

For example, the boundary node M in the region 2 is directly connected with the node Q in the region 3, and the node Q is the ingress boundary node in the region 3, thus the node M is determined as the egress boundary node; and by the same token, it is obtained that the node P is the egress boundary node.

If the boundary node is located in a upstream region, path tracing is done from the source node to the target node, and in the intermediate passing region, if the boundary node and the egress boundary node in the intermediate passing region are passed and the return path does not pass the other boundary nodes in the target region, the boundary node is determined as the ingress boundary node of the intermediate passing region.

For example, path tracing is done from the node A to the node V, the routing goes through the node G in the region 2 and the other boundary nodes of the region are not included on the return path, thus the node G can be determined as the ingress boundary node; and by the same token, it is obtained that the node H is the ingress boundary node and the node K is not the ingress boundary node.

When the boundary node is located in a current source region, and if the boundary node is directly connected with the ingress boundary node in the downstream adjacent region, the boundary node is determined as the egress boundary node of the source region.

For example, the boundary node E in the region 1 is directly connected with the node G in the region 2, and the node G is the ingress boundary node in the region 2, thus the node G is determined as the ingress boundary node; and by the same token, it is obtained that the node F is the ingress boundary node and the node C is not the ingress boundary node.

It can be obtained that, in a direction from the node A to node V, E and F are the egress boundary nodes of the region 1, G and H are the ingress boundary nodes of the region 2, M and P are the egress boundary nodes of the region 2, and Q and R are the ingress boundary nodes of the region 3.

In step 203, a segment path in the region in which the PCE is located is acquired.

The segment path includes: in the source region, a path from the source node to the egress boundary node in the source region calculated by the PCE; in the intermediate passing region, a path from the ingress boundary node in the current region to the egress boundary node in the current region calculated by the PCE; and in the target region, a path from the ingress boundary node in the current region to the target node calculated by the PCE.

In the network shown in FIG. 1, the PCE1 acquires the paths from the node A to the node E and node F respectively; the PCE2 acquires the paths from the node G and node H to the node M and node P respectively; and the PCE3 acquires the paths from the node G and node R to the node V, for example, the shortest paths obtained by the PCE3 are V-T-Q and V-R.

In step 204, according to the segment path, a full path between the source node and target node is generated.

Wherein, the full path is also called as a Virtual Shortest Path Tree (VSPT).

Specifically, according to a connection condition of the ingress and egress boundary nodes in the adjacent regions, the full path between the source node and target node is obtained by using a BRPC method.

In step 205, wavelength assignments are performed for the full path.

For example, a path on which the PCE1 successfully executed Wavelength Assignments (WA) is: A (egress wavelength λ1, ingress wavelength λ1)-(egress wavelength λ1, ingress wavelength λ1) F (egress wavelength λ1, ingress wavelength λ1)-(egress wavelength λ1, ingress wavelength λ1) H (egress wavelength λ1, ingress wavelength λ1)-(egress wavelength λ1, ingress wavelength λ1) I (egress wavelength λ1, ingress wavelength λ1)-(egress wavelength λ1, ingress wavelength λ1) G (egress wavelength λ1, ingress wavelength λ1)-(egress wavelength λ1, ingress wavelength λ1) M (egress wavelength λ1, ingress wavelength λ1)-(egress wavelength λ1, ingress wavelength λ1) Q (egress wavelength λ1, ingress wavelength λ1)-(egress wavelength λ1, ingress wavelength λ1) T (egress wavelength λ1, ingress wavelength λ1)-(egress wavelength λ1, ingress wavelength λ1) V.

It can be obtained that, the TE LSP between the node A and node V is A, F, H, I, G, M, Q, T, V. The node A initiates a flow of establishing the TE LSP.

Alternatively, if the wavelength assignment is failed, the reason may be that the return path in the region 3 has no wavelength resources; thus the PCE1 informs the PCE3 to increase a number of the segment paths. For example, a new segment path V-T-S-Q is added to the original segment paths of V-T-Q and V-R in the region 3.

The PCE1 executes the Wavelength Assignments (WA) again, and a successful return path is: A (egress wavelength λ1, ingress wavelength λ1)-(egress wavelength λ1, ingress wavelength λ1) F (egress wavelength λ1, ingress wavelength λ1)-(egress wavelength λ1, ingress wavelength λ1) H (egress wavelength λ1, ingress wavelength λ1)-(egress wavelength λ1, ingress wavelength λ1) I (egress wavelength λ1, ingress wavelength λ1)-(egress wavelength λ1, ingress wavelength λ1) G (egress wavelength λ1, ingress wavelength λ1)-(egress wavelength λ1, ingress wavelength λ1) M (egress wavelength λ1, ingress wavelength λ1)-(egress wavelength λ1, ingress wavelength λ1) Q (egress wavelength λ1, ingress wavelength λ1)-(egress wavelength λ1, ingress wavelength λ1) S (egress wavelength λ1, ingress wavelength λ1)-(egress wavelength λ1, ingress wavelength λ1) T (egress wavelength λ1, ingress wavelength λ1)-(egress wavelength λ1, ingress wavelength λ1) V.

It can be obtained that, the TE LSP between the node A and node V is A, F, H, I, G, M, Q, S, T, V. The node A initiates a flow of establishing the TE LSP.

In the technical scheme provided by the present invention, by performing path tracing from a source node to a target node, a PCE performing path collaborative computing is obtained; available ingress and egress nodes are selected from boundary nodes of the region in which the PCE performing path collaborative computing is located; and according to the available ingress and egress nodes, a complete VSPT is obtained by using a BRPC algorithm, and wavelength resources required in each region is assigned for the complete VSPT, thereby implementing a spanning path computation and achieving the purpose of communication between two nodes in different regions.

Figure 3:
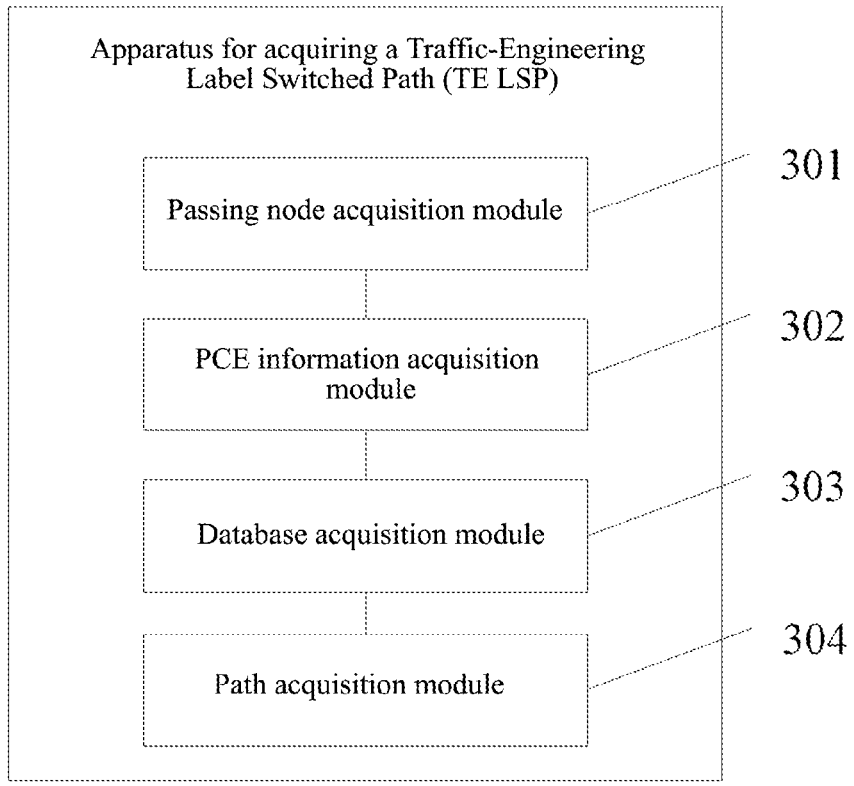
FIG. 3 is a structural schematic diagram of the apparatus for acquiring a Traffic-Engineering Label Switched Path provided by the present invention.

As shown in FIG. 3, the present invention provides an apparatus for acquiring a Traffic-Engineering Label Switched Path (TE LSP), which comprises:

a passing node acquisition module 301, configured to: perform path tracing from a source node to a target node, and obtain a passing node passed by the path tracing;

a PCE information acquisition module 302, configured to: acquire a PCE in a region in which the passing node is located;

a database acquisition module 303, configured to: acquire traffic-engineering database of a region in which the PCE is located from the PCE; and a path acquisition module 304, configured to: according to the traffic-engineering database, obtain the TE LSP between the source node and the target node.

Figure 4:
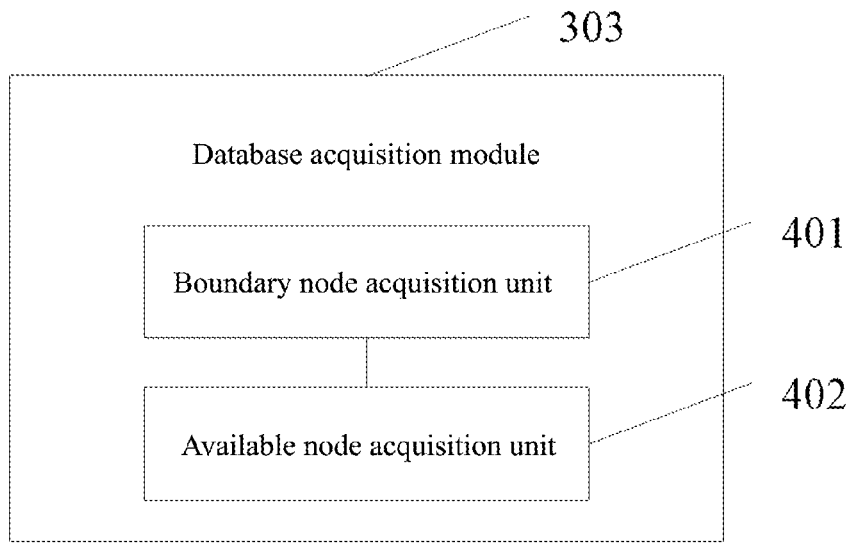
FIG. 4 is a structural schematic diagram of the database acquisition module 303 in the example shown in FIG. 3.

Furthermore, as shown in FIG. 4, the database acquisition module 303 can further comprise:

a boundary node acquisition unit 401, configured to: acquire a boundary node in the region in which the PCE is located from the PCE;

an available node acquisition unit 402, configured to: from boundary nodes of each region, select an ingress boundary node and/or an egress boundary node in each region.

Wherein, the ingress boundary node and/or egress boundary node is selected in the following way:

if the path tracing passes the boundary node and a return path does not pass other boundary nodes of a region in which the boundary node is located, determine the boundary node as the ingress boundary node of the region in which the boundary node is located;

if the boundary node is directly connected with an ingress boundary node in a downstream adjacent region, determine this boundary node as the egress boundary node in a source region.

Figure 5:
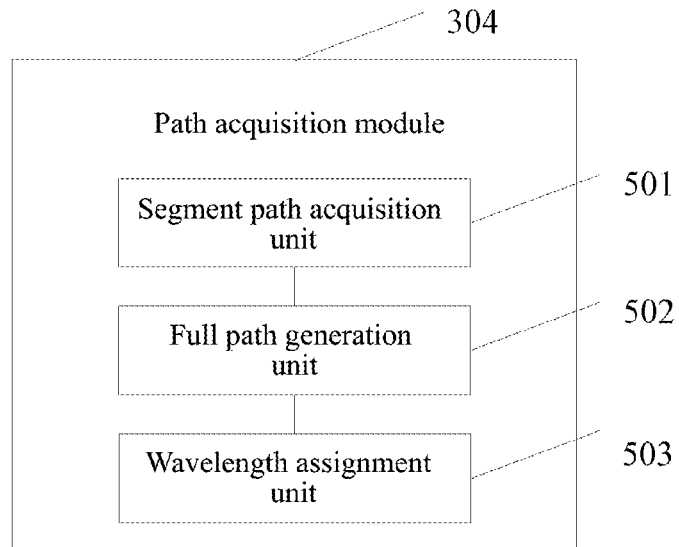
FIG. 5 is one structural schematic diagram of the path acquisition module 304 in the example shown in FIG. 3.

Furthermore, as shown in FIG. 5, the path acquisition module 304 can further comprise:

a segment path acquisition unit 501, configured to: acquire a segment path in each region, wherein, the segment path comprises a path from the source node to the egress boundary node in the region, a path from the ingress boundary node to the target node in the region in which the target node is located, and a path between the ingress boundary node and egress boundary node in the region in which the passing node is located; a full path generation unit 502, configured to: according to the segment path in each region, generate a full path between the source node and target node; and a wavelength assignment unit 503, configured to: perform wavelength assignment for the generated full path, and if the wavelength assignment is successful, determine the full path as the TE LSP of the source node and target node.

Figure 6:
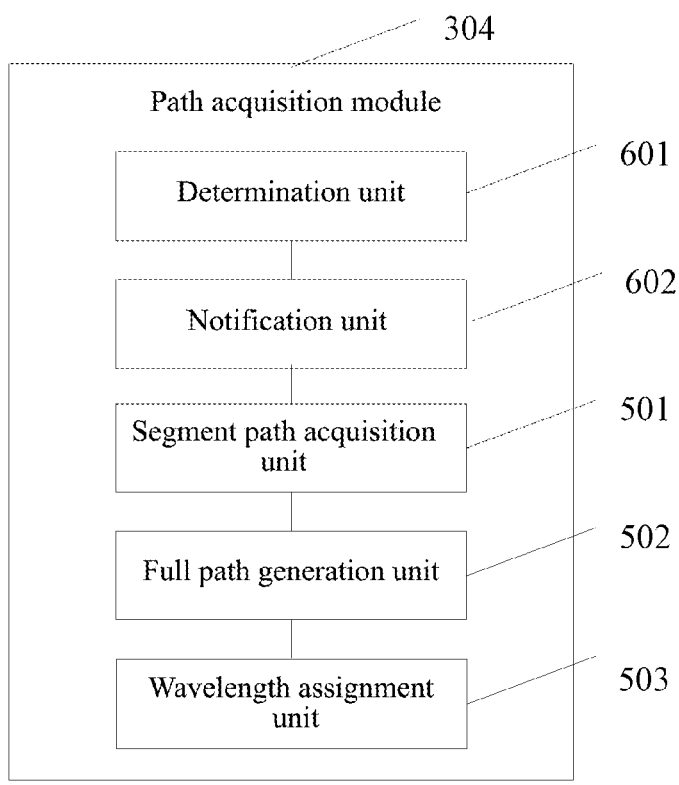
FIG. 6 is another structural schematic diagram of the path acquisition module 304 in the example shown in FIG. 5.

Furthermore, as shown in FIG. 6, the path acquisition module can further comprise:

a determination unit 601, configured to: when the wavelength assignment of the full path is failed, determine a region in which the wavelength assignment is failed;

a notification unit 602, configured to: inform the PCE in the region in which the wavelength assignment is failed to increase a number of the segment paths.

In the technical scheme provided by the present invention, by performing path tracing from a source node to a target node, a PCE performing path collaborative computing is obtained; from boundary nodes of the region in which the PCE performing path collaborative computing is located, available ingress and egress nodes are selected; and according to the available ingress and egress nodes, a complete VSPT is obtained by using a BRPC algorithm, and wavelength resources required in each region is assigned for the complete VSPT, thereby implementing a spanning path computation and achieving the purpose of communication between two nodes in different regions.

The ordinary skilled in the art can understand that all or part of steps for implementing the above examples can be completed through a program instructing related hardware, and the program can be stored in a computer readable memory medium. When the program is carried out, one of the steps or a combination of the steps of the method examples is comprised.

In addition, each function unit in each example of the present invention can be implemented by adopting a form of hardware, and also can be implemented by adopting a form of software function module. If implemented in a form of software function module and sold or used as an independent product, the integrated module can also be stored in a computer readable memory medium.

The memory medium mentioned above can be a read-only memory, magnetic disk or optical disk and so on.

The above description is only the specific embodiments of the present invention, but the protection scope of the present invention is not limited to this, any person skilled in the art can easily conceive changes and substitutions within the technical scope disclosed by the present invention, and these changes and substitutions shall all fall into the protection scope of the present invention. Therefore, the protection scope of the present invention should be subject to the protection scope described in the claims.

INDUSTRIAL APPLICABILITY

In the technical scheme provided by the present invention, by performing path tracing from a source node to a target node, a PCE performing path collaborative computing is obtained, and according to collaborative computing of the PCE, a TED used for the path collaborative computing is obtained, thereby acquiring a precondition used to implement the BRPC, implementing a spanning path computation, and achieving the purpose of communication between two nodes in different regions.

What is claimed is:

1. A method for acquiring a Traffic-Engineering Label Switched Path (TE LSP), comprising:
    performing tracing of a path from a source node to a target node to obtain information of passing nodes passed by a path tracing, wherein the source node is located in a source region, the target node is located in a target region, the source region and the target region are connected through one or more intermediate passing regions and wherein the path tracing comprises a tracert message and requires at least the passing nodes not to reply to the tracert message;
    acquiring Path Compute Element (PCE) information of the source region, the one or more intermediate regions and the target region, respectively;
    acquiring a traffic-engineering database from each of said PCE information, respectively;
    obtaining the TE LSP between the source node and the target node according to the acquired traffic-engineering databases; wherein
    the step of acquiring traffic-engineering databases comprises:
    acquiring information of boundary nodes of the source region, the target region, and the one or more intermediate passing regions from each of said PCE information, respectively;
    selecting an ingress boundary node in the target region, an egress boundary node in the source region, and an ingress boundary node and an egress boundary node in each of the one or more intermediate passing regions based on the information of boundary nodes, respectively; wherein,
    if a boundary node is located in the target region, and the path tracing goes through the boundary node and a return path does not pass other boundary nodes of the target region, determining the boundary node as an ingress boundary node of the target region;
    if a boundary node of an intermediate passing region is directly connected with an ingress boundary node of the target region, determining the boundary node as an egress boundary node of the intermediate passing region;
    if a boundary node is located in an intermediate passing region and directly connected with the ingress boundary node of a region downstream and adjacent to the intermediate passing region, determining the boundary node as an egress node of the intermediate passing region;
    if a boundary node is located in an intermediate passing region, and the path tracing passed the boundary node and an egress boundary node of the intermediate passing region, and the return path does not pass other boundary nodes of the intermediate passing region, determining the boundary node as an ingress boundary node of the intermediate passing region;
    if a boundary node of the source region is directly connected with an ingress boundary of a downstream adjacent intermediate passing region, determining the boundary as an egress boundary node of the source region.

2. The method according to claim 1, wherein, the step of obtaining the TE LSP between the source node and target node according to the traffic-engineering databases comprises:
    acquiring a segment path in each region from each of said PCE information, and the segment path comprising a path from the source node to the egress boundary node in the source region, a path from the ingress boundary node to the target node in the target region, and a path between the ingress boundary node and egress boundary node in each of the one or more intermediate passing regions;
    generating a full path between the source node and target node according to the segment path in each region; and
    performing wavelength assignment for the generated full path, and if the wavelength assignment is successful, determining the full path as the TE LSP of the source node and target node.

3. The method according to claim 2, wherein, the method further comprises:
    if the wavelength assignment is failed, determining a region in which the wavelength assignment is failed;
    informing, by the source region PCE, the PCE of the region in which the wavelength assignment is failed to increase a number of the segment paths.

4. An apparatus for acquiring a Traffic-Engineering Label Switched Path (TE LSP), comprising at least one processor and a storage device, wherein the storage device stores following modules to be executed by the at least one processor:
    a passing node information acquisition module, configured to trace from a source node to a target node to obtain information of passing nodes passed by the path tracing, wherein the source node is located in a source region, the target node is located in a target, the source region and the target region are connected through one or more intermediate passing regions, wherein the path tracing comprises a tracert message and requires at least the passing nodes not to reply to the tracert message;
    a Path Compute Element (PCE) information acquisition module, configured to acquire PCE information of the source region, the one or more intermediate regions and the target region, respectively;
    a database acquisition module, configured to acquire traffic-engineering databases from each of said PCE information, respectively; and
    a path acquisition module, configured to obtain the TE LSP between the source node and the target node according to the acquired traffic-engineering databases; wherein
    the database acquisition module comprises:
    a boundary node information acquisition unit, configured to acquire information of boundary nodes from the source region PCE, the target region PCE and the one or more intermediate passing region PCEs, respectively;
    an available node acquisition unit, configured to select an ingress boundary node in the target region, an egress boundary node in the source region, and an ingress boundary node and an egress boundary node in each of the one or more intermediate passing regions based on the information of the boundary nodes, respectively;
    wherein, the available node acquisition unit is configured to:
    if a boundary node is located in the target region, and the path tracing goes through the boundary node and a return path does not pass other boundary nodes of the target region, determine the boundary node as an ingress boundary node of the target region;
    if a boundary node of an intermediate passing region is directly connected with an ingress boundary node of the target region, determine the boundary node as an egress boundary node of the intermediate passing region;

if a boundary node is located in an intermediate passing region and directly connected with the ingress boundary node of a region downstream and adjacent to the intermediate passing region, determine the boundary node as an egress node of the intermediate passing region;

if a boundary node is located in an intermediate passing region, and the path tracing passed the boundary node and an egress boundary node of the intermediate passing region, and the return path does not pass other boundary nodes of the intermediate passing region, determine the boundary node as an ingress boundary node of the intermediate passing region;

if a boundary node of the source region is directly connected with an ingress boundary node of a downstream adjacent intermediate passing region, determine the boundary node as an egress boundary node of the source region.

5. The apparatus according to claim 4, wherein, the path acquisition module comprises:

a segment path acquisition unit, configured to acquire a segment path in each region from each of said PCE information, wherein, the segment path comprises a path from the source node to the egress boundary node in the source region, a path from the ingress boundary node to the target node in the target region, and a path between the ingress boundary node and egress boundary node in each of the one or more intermediate passing regions;

a full path generation unit, configured to generate a full path between the source node and target node according to the segment path in each region; and a wavelength assignment unit, configured to perform wavelength assignment for the generated full path, and if the wavelength assignment is successful, determine the full path as the TE LSP of the source node and target node.

6. The apparatus according to claim 5, wherein, the path acquisition module further comprises:

a determination unit, configured to determine a region in which a wavelength assignment is failed when the wavelength assignment of the full path is failed;

a notification unit, configured to inform, by the source PCE, the PCE of the region in which the wavelength assignment is failed to increase a number of the segment paths.

* * * * *

UNITED STATES PATENT AND TRADEMARK OFFICE
CERTIFICATE OF CORRECTION

| | | |
|---|---|---|
| PATENT NO. | : 8,971,214 B2 | Page 1 of 1 |
| APPLICATION NO. | : 13/512124 | |
| DATED | : March 3, 2015 | |
| INVENTOR(S) | : Wei Zhao et al. | |

It is certified that error appears in the above-identified patent and that said Letters Patent is hereby corrected as shown below:

On the Title Page:

The International Filing Date should read --

(22)   PCT Filed:   April 21, 2010

Signed and Sealed this
Eleventh Day of August, 2015

Michelle K. Lee
*Director of the United States Patent and Trademark Office*